(No Model.)
P. H. DUNAGAN.
APPARATUS FOR UTILIZING THE SCUM FROM PULVERIZED ORES.
No. 244,569. Patented July 19, 1881.
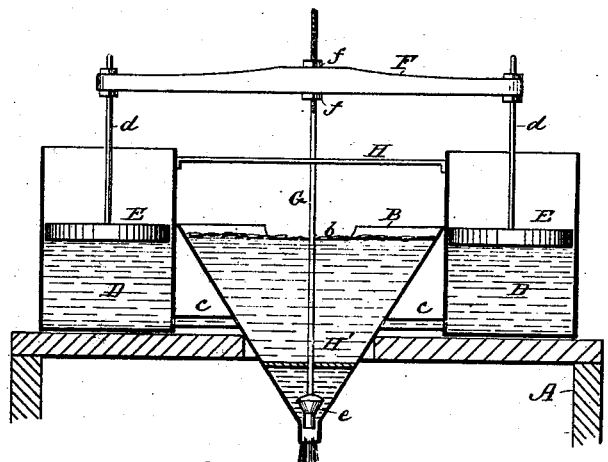
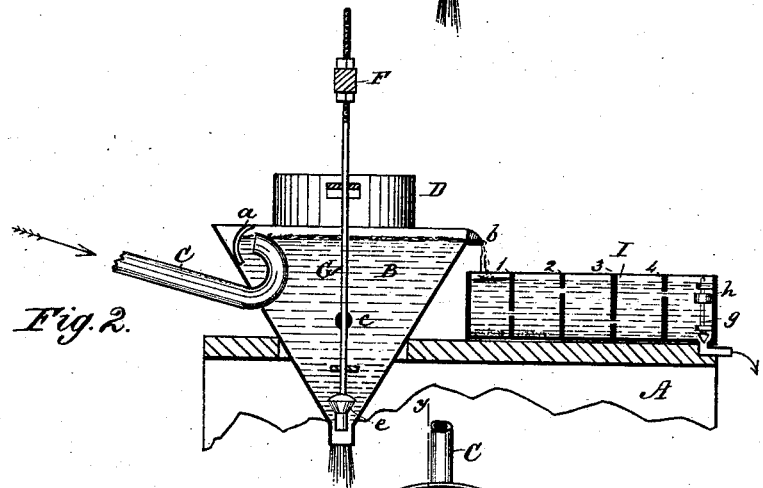
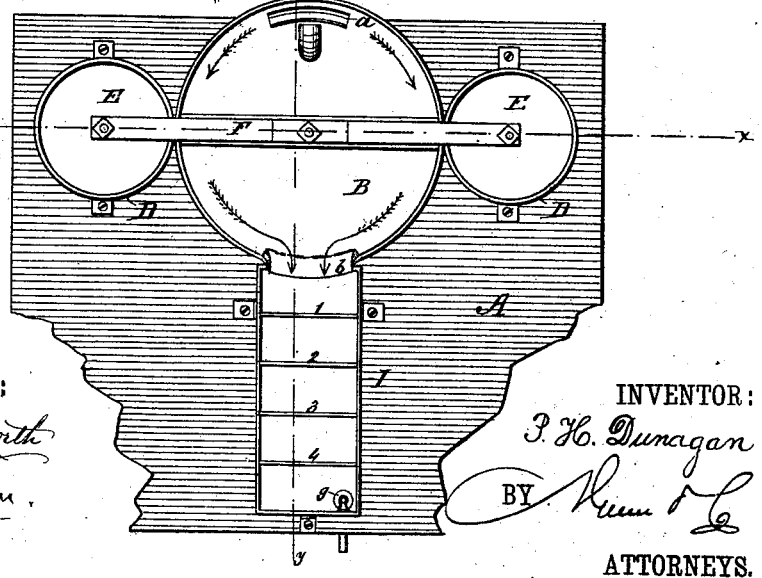
WITNESSES:
W. W. Hollingsworth
Edw. W. Byrn
INVENTOR:
P. H. Dunagan
BY
ATTORNEYS.

UNITED STATES PATENT OFFICE.

PATRICK H. DUNAGAN, OF BOULDER, COLORADO, ASSIGNOR TO AARON McGRAW, OF SAME PLACE.

APPARATUS FOR UTILIZING THE SCUM FROM PULVERIZED ORES.

SPECIFICATION forming part of Letters Patent No. 244,569, dated July 19, 1881.

Application filed November 29, 1880. (No model.)

*To all whom it may concern:*

Be it known that I, PATRICK H. DUNAGAN, of Boulder, in the county of Boulder and State of Colorado, have invented a new and Improved Apparatus for Utilizing the Scum from Pulverized Ores; and I do hereby declare that the following is a full, clear, and exact description of the same, reference being had to the accompanying drawings, forming part of this specification, in which—

Figure 1 is a vertical section through the line $x\ x$ of Fig. 3. Fig. 2 is a vertical section through the line $y\ y$ of Fig. 3. Fig. 3 is a plan view.

In pulverizing and concentrating ore for smelting a considerable portion of the ore, which is of light specific gravity, floats as a scum on the surface of the water as it passes from the stamp-mill or pulverizer to the concentrator and is thrown off as waste. I have found that this scum is very rich in the metals which are sought to be saved, the said metals existing in said scum as sulphurets, chlorides, oxides, &c., which, by reason of their comparatively light specific gravity, do not readily sink to the bottom with the other ores, but float on the surface.

The object of my invention is to provide an apparatus for saving and separating this scum, which apparatus is designed to be placed between the pulverizing-mill and the concentrators, but which may be made to act upon the tailings or any form of pulverized ore with valuable results.

The invention consists in the construction and arrangement of a funnel-shaped pan, into which the water and pulverized ore are admitted through a pipe directly against the sides of the pan, and with which pan is combined an automatic valve arranged in its bottom, through which the bulk of the water and ore passes, which valve is controlled by floats in adjacent cylinders, which communicate with the pan, so that the water in this pan is preserved at a constant level to secure the constant discharge of the scum over a lip upon one side of the pan.

The invention also consists in the peculiar construction of a settling-tank for receiving the scum, as hereinafter fully described.

In the drawings, A represents any suitable frame-work, upon which the apparatus is mounted.

B is the receiving-pan, which is made funnel-shaped, and into which the pulverized ore and water from the stamp-mill or other pulverizer is delivered. This pan is suitably supported in the frame-work at a distance of several feet beneath the discharge-outlet of the stamp-mill, so that the water and pulverized ore shall have sufficient fall to enter the pan B with some force. For introducing the water and ore to this pan in a proper manner a pipe, C, of sufficient size, is employed, which enters the pan below its upper edge and then curves upwardly and outwardly, so as to direct the entering stream full against the side of the pan, which latter has at the point of impact a lip or guard-plate, $a$, curved upwardly and over for the purpose of resisting wear, preventing the overflow from the surging up of the water at this point, and also for the purpose of dividing the current and causing a double wave or ripple on the surface of the water in the pan, one of which passes to one side and the other to the other, as shown by the arrows in Fig. 3, so that when these two ripples meet at a diametrical point an outward or radial current is the result, which causes the lighter scum to pass over the depressed lip $b$ of the pan, which is situated directly opposite the point where the water and ore are admitted. The bulk of the water and all the heavier portions of the ore pass out of the pan at the bottom, and this discharge must be so regulated that the level of the water in the pan will be constantly maintained at the lip $b$, so that the scum may constantly pass over with as little water as possible. To secure this uniformity in the level of the water in the pan I arrange by the side of the pan one, or preferably two, cylinders, D D, on opposite sides of the same, and connect them with the pan by means of pipes $c\ c$. Then in these cylinders, whose upper ends are open, I arrange floats E E, which are connected by rods $d\ d$ to a cross-head, F, which latter is adjustably attached to a valve-stem, G, passing through and guided by an upper perforated cross-bar, H, and a lower cross-bar, H', and carrying on its lower end a valve, $e$, which opens or closes the discharge-orifice in the bottom of the pan. Now, these floats in the cylinders are adjusted by means of the nuts $ff$ and screw-threaded end of the valve-rod, so that when the valve is open a distance sufficient for the regular and normal feed the floats will, at that adjustment, be exactly at the same level as the water in the pan, or about the level of the lip $b$. Now, if an excessive quantity of water and ore be admitted to the pan it will be seen that as the level of the water in pan B rises the floats in the adjacent cylinders will also rise, and by lifting the valve will open the discharge-orifice of the pan to accommodate this increased admission of material and preserve the level of the water, so that the scum will constantly pass off. If, on the other hand, a less quantity of materials is fed to the pan, as the level of the water falls in the pan the floats also descend, and by partially closing the valve make the overflow commensurate with the inflow, and preserving, by the same principle, the uniform level in pan B. As the scum and a small proportion of the water pass over lip $b$ it is received into a settling-tank, I, which is divided by partitions 1 2 3 4, and has at its discharge end an outlet controlled by a valve, $g$, with a float, $h$. The first one, 1, of these partitions has a transverse opening near the bottom, the second one, 2, near the top, the third one, 3, near the bottom, and the fourth one, 4, near the top. The object of this tank is to collect and save the scum and separate it from the water, which is run off through the valve $g$. After the same enters the first compartment of the tank it remains on the surface for a longer or shorter time, while the water passes through the opening below in partition No. 1 to the next compartment. While the scum is in the first compartment in a state of quiescence it gradually becomes more or less saturated with water, and as soon as this takes place it sinks to the bottom as a deposit, and as it precipitates a small proportion will be carried through the opening in partition 1; and to secure the deposition of this in the second compartment I place the opening from the second compartment to the third near the top, so as to avoid a direct current and make the water more quiescent and better adapted to depositing the small particles held in suspension. As the water passes successively through the other partition a successively smaller proportion of the valuable matters are deposited, and when the accumulation in these tanks shall have been sufficient to justify it the contents are taken out and smelted in the usual way.

By means of this apparatus I am enabled not only to save a much larger per cent. of the valuable metals, but am enabled, also, to profitably work over the tailings of all kinds from other mills.

Having thus described my invention, what I claim as new is—

1. The combination, with a pan having an inlet-pipe, a discharge-orifice at the bottom, and an overflow-lip at its edge, of an automatically-adjustable valve adapted to make the outflow commensurate with the inflow and preserve a constant level for the water, substantially as described.

2. The combination, with a pan having an outlet at the bottom and a depressed lip at its upper edge, of an inlet-pipe arranged to discharge the inflowing materials outwardly against the side of the pan at a point diametrically opposite the depressed lip, whereby a double ripple and two oppositely-moving currents are made on the surface, which unite at a diametrical point to form an outward radial current for the floating matter, as described.

3. The combination, with the pan B, having an inlet at the side, an overflow at the other side, and an outlet at the bottom, of a valve, $e$, valve-stem G, cross-head F, rods $d\ d$, floats E E, and receptacles D D, having communication with the pan, as shown and described.

4. The settling-tank I, having partitions therein, with openings through the same alternately at the top and bottom, and having at one end an automatic float-valve, as and for the purpose described.

5. The combination, with the tapering and funnel-shaped fan B, of the inlet-pipe arranged, as described, to direct its discharge outwardly, and a curved lip fixed to the pan and adapted to receive the impact of said discharge, as described, and for the purpose set forth.

PATRICK HALE DUNAGAN.

Witnesses:
GEO. ROGERS,
E. S. WALKER.